United States Patent [19]

Harrison

[11] Patent Number: 4,655,370

[45] Date of Patent: Apr. 7, 1987

[54] FEED METER FOR CONVEYED MATERIAL

[75] Inventor: H. Page Harrison, Edmonton, Canada

[73] Assignee: Canadian Patents and Development Limited, Ottawa, Canada

[21] Appl. No.: 681,000

[22] Filed: Dec. 13, 1984

[51] Int. Cl.⁴ .............................................. B67D 5/08
[52] U.S. Cl. ....................................... 222/57; 222/71; 73/227; 73/861.77
[58] Field of Search ........................ 222/57, 52, 59, 71, 222/23, 14; 73/861, 227, 861.77, 861.35; 250/577

[56] References Cited

U.S. PATENT DOCUMENTS

| | | | |
|---|---|---|---|
| 1,025,227 | 5/1912 | Wylie | 73/227 |
| 2,962,895 | 12/1960 | Rumble | 73/861.77 |
| 3,230,767 | 1/1966 | Heigl et al. | 73/861.77 |
| 3,236,605 | 2/1966 | Pierson | 222/57 |
| 3,821,558 | 6/1974 | Mansfield | 250/577 |
| 3,821,896 | 7/1974 | Grab | 73/861.77 |
| 4,422,714 | 12/1983 | Benoit et al. | 250/577 |

FOREIGN PATENT DOCUMENTS 1098963  7/1966  United Kingdom ................ 250/577

Primary Examiner—Joseph J. Rolla
Assistant Examiner—Kenneth Noland
Attorney, Agent, or Firm—Ronald G. Bitner

[57] ABSTRACT

A feed meter for determining the feed rate of conveyed material comprising a rotatable encoded disc which rotates in proportion to the velocity of conveyed material and displaces the disc in proportion to the depth of material being conveyed, whereby a fixed detector provides an output representative of feed rate. One use of the feed meters is for controlling the application rate of additive material to conveyed material.

4 Claims, 3 Drawing Figures

FEED METER FOR CONVEYED MATERIAL

BACKGROUND OF THE INVENTION

This invention relates to a feed meter for conveyed material, and particularly for the control of the application rate of additives to conveyed material.

In many processing systems it is necessary or desirable to measure the throughput or feed rate of material being processed or conveyed. For example, in the storage of forage or grain, chemicals are added to inhibit microbial activity. A significant deterrant to the use of chemicals for enhanced preservation of forage and grain is the inability to apply them evenly, and at the required application rate. The ratio of the applied chemical to the forage and grain is often quite small. Small application rates makes uniform distribution difficult. Portions which have insufficient chemicals are not suitably protected while portions which have too much is a waste of the chemical. Furthermore, an excess of some chemicals can be harmful to animals injesting the treated feed. It is generally impractical to disburse granular or liquid additives evenly in stored forage or grain. Therefore the only feasible method is to apply the chemical as it is processed or conveyed. For example, forage harvesters and balers can be used for field treatment of forage. Forage blowers and grain augers can be used while elevating forage and grain.

With present methods the chemical flow rate of the applicator is based on a calibration of the throughput of the forage or grain with respect to time, and this is often in error. Furthermore fluctuations in the throughput or feed rate of the processor or conveyor may or may not be compensated by the operator, and small fluctuations go unnoticed. The normal condition is over or under application of the chemical resulting in a chemical loss and uneven distribution at best. At worst over application can cause feed toxicity. Also the loss of some chemicals to the atmosphere can make it hazardous for the operator.

SUMMARY OF THE INVENTION

An object of the present invention is to provide a simple feed meter for determining the feed rate of a processor or conveyor, and particularly for the control of the application rate of additives to the conveyed material.

The feed meter of the present invention comprises a rotatable encoded disc having concentrically arranged readout elements that vary quantitatively in relation to the radial distance from the center of the disc; detector means for detecting the readout elements of the encoded disc; and follower means operatively associated with the disc for rotating the disc in proportion to the velocity of conveyed material and displacing the disc relative to the detector in proportion to the cross-sectional area of material being conveyed wherein the detector provides an output signal representing feed rate.

DESCRIPTION OF PREFERRED EMBODIMENTS

Figure 1:
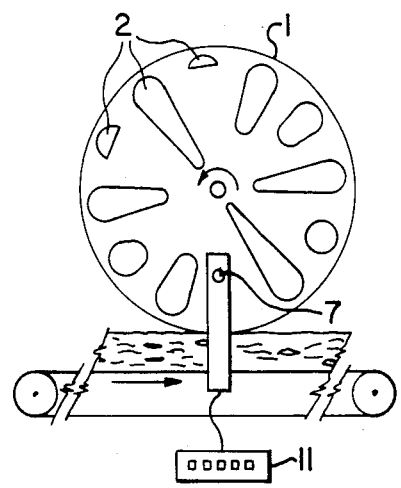
FIG. 1 is a schematic illustration of a feed meter in accordance with the present invention.
Figure 2:
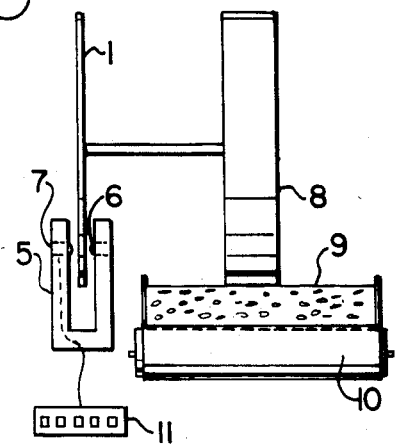
FIG. 2 is an alternate view of the feed meter of FIG. 1.

With reference to FIGS. 1 and 2 the feed meter of the present invention comprises a rotatable encoded disc 1 having a plurality of concentrically arranged readout elements 2. The number of readout elements 2 varies with the radial distance from the center 3 of the disc 1, with a lesser number of elements nearer the center 3. A detector unit 5, comprising an emitter 6 and detector 7 is arranged to sense the readout elements as the disc rotates.

The disc 1 is operatively connected to a rotary follower 8 that rides along the material 9 being conveyed by the conveyor 10, rotating the disc at an angular speed proportional to the velocity of the conveyed material and displacing the disc relative to the detector in proportion to the depth of the conveyed material.

In operation, when the detector is displaced radially by the conveyed material, the pattern count is proportional to the depth of the material. For a conveyor of constant width, as shown, the pattern count is also proportional to the cross-sectional area of the material being conveyed. When the disc rotates in relation to the movement of the material, the pattern count is proportional to the velocity of the commodity. As a pattern count at any time is the function of the number of pattern counts due to rotation times the number due to displacement, then the count is a function of the feed rate. Hence the output of the detector can be used to provide an indication of feed rate with a suitable indicator 11, or the output signal can be used to control the application rate of a chemical as described with reference to FIG. 3.

The detector may sense the pattern on the disc either optically or magnetically. A photo transistor is the usual type of optical sensor whereas a magnetic sensor may be either a Hall-effect or a magnet pickup type. The disc for the optical detector may be direct or reflective light. For the magnetic detector the disk may have magnets, either circular or strip, or some combination of the two, mounted on its surface.

Figure 3:
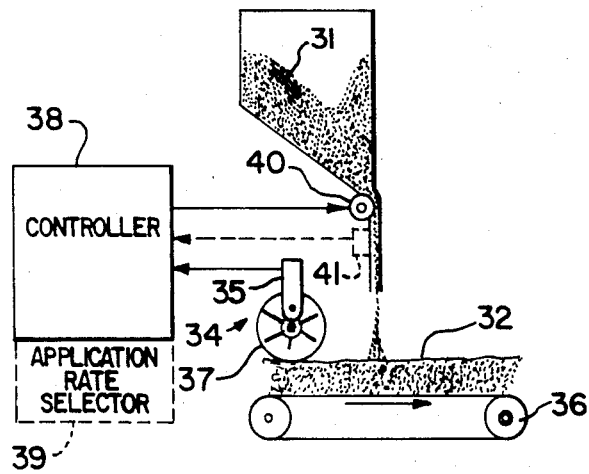
FIG. 3 is a schematic illustration of a system for applying a chemical to conveyed material using the feed meter of the type illustrated in FIG. 1 or 2.

The disc itself may follow the conveyed material as represented in FIG. 3, or may be operatively connected to a separate follower as shown in FIG. 2.

A number of feed meters may be used for which the output is averaged in the case of a relatively wide conveyor and having a variable depth of the material across its width.

The disc may be rotated by various types of conveyors such as a grain auger, or a conveying component of a processing machine, such as a feed roll of a forage harvester. It may also be directly driven by the flow of the commodity entering a machine, such as a window into a baler or combine. The displacement may be achieved by mounting the disc on a feed roll shaft, as in the case of the forage harvester, or by it responding to the torque in the drive as in the case of the grain auger. Various mechanisms can be used to enable the detector to displace with torque or other parameter representing the cross-sectional area of material being conveyed.

FIG. 3 illustrates a system for applying a chemical 31 to conveyed material 32 and incorporating a feed meter 34 as previously described.

As previously described the detector 35 provides a measure of the feed rate of material 32 along conveyor 36 by sensing the angular velocity and displacement of the disc 37. The output of the detector is sent to a controller 38 which computes the appropriate application rate in accordance with the selected ratio, which is preferably made adjustable by means of a suitable selector 39. The controller regulates the flow control device 40 to dispense the material to be added at the appropriate rate.

The control device 40 may take various forms depending on the nature of the additive being dispensed. For example, in the case of a liquid, the control device may be a variable speed pump or a valve while for granular material application may be controlled by a variable orifice device or a variable speed metering device.

The system may also include a flow measuring device 41, for the applied material 31, the output of which can be utilized by the controller 38 for regulating the flow control device 40.

I claim:

1. A feed meter for determining the feed rate of conveyed material, comprising:
   a rotatable encoded disc having concentrically arranged readout elements that vary quantitatively in relation to the radial distance from the center of the disc;
   detector means for detecting the readout elements of the encoded disc;
   said readout elements having varying radial lengths; and
   follower means operatively associated with said discs for rotating the disc in porportion to the velocity of conveyed material and displacing the disc relative to the detector in proportion to the cross-sectional area of material being conveyed such that the number of readout elements detected varies in proportion to the displacement of the disc, wherein the detector provides an output signal representing feed rate.

2. A system for controlling the application rate of additive material to conveyed material as a function of the feed rate of the conveyed material, comprising:
   a rotatable encoded disc having concentrically arranged readout elements that vary quantitatively in relation to the radial distance from the center of the disc;
   detector means for detecting the readout elements of the encoded disc;
   follower means operatively associated with said disc for rotating the disc in proportion to the velocity of conveyed material and displacing the disc relative to the detector in proportion to the cross-sectional area of material being conveyed, whereby the detector provides an output signal representing feed rate;
   supply means for additive material;
   a dispensing control device for controlling the dispensing of the additive material; and
   a controller responsive to the output signal of the detector for controlling the dispensing control device according to a selected ratio of additive material to conveyed material.

3. The system of claim 2 wherein the encoded disc comprises readout elements of varying lengths such that the number of elements detected varies in proportion to displacement.

4. The system of claim 2 further comprising a flow measuring device to provide a signal representing the rate of additive material dispensed for utilization by the controller.

* * * * *